June 4, 1940.　　　　W. BOBEK　　　　2,203,041
CONCEALED HINGE
Filed Jan. 24, 1938

INVENTOR
William Bobek
BY
Harness, Dickey & Pierce
ATTORNEYS

Patented June 4, 1940

2,203,041

UNITED STATES PATENT OFFICE 2,203,041

CONCEALED HINGE

William Bobek, Detroit, Mich.

Application January 24, 1938, Serial No. 186,553

13 Claims. (Cl. 16—178)

This invention relates to improvements in concealed hinges and more especially to hinges for the doors of an automobile body.

In the automobile body art it is highly desirable to employ hinges of the concealed type in order to maintain a finished appearance of the body, to avoid unsightly projections, and in streamlined types of automobile bodies to avoid projections which would offer resistance to flow of air along the surface of the body. Since streamline types of automobile bodies employ curved panels, it is essential that a concealed type of hinge provides ample clearance between adjacent parts of the body and door as the latter swings to open position.

One of the objects of the present invention is to improve the art of concealed door hinges.

Another object of the invention is to provide a concealed hinge, the main parts of which may be readily disassembled for the purpose of removing the door from the body.

Another object of the invention is to provide a concealed type of hinge which causes the door to swing about an imaginary axis as a center, which axis passes through no mechanical parts of the hinge, and also to swing about an axis which is the axis of one of the actual mechanical parts of the hinge construction.

Another object of the invention is to provide in a concealed hinge means for readily adjusting the clearance between the door and door frame.

Other objects, features and advantages will become apparent from the following description and appended claims.

For the purpose of illustrating the genus of the invention, reference may be had to the accompanying drawing in which.

Figure 2:
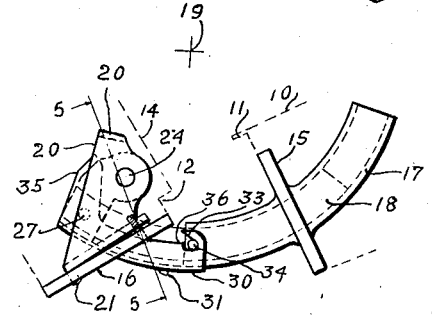
Fig. 2 is a top plan of the hinge construction shown in Fig. 1.
Figure 3:
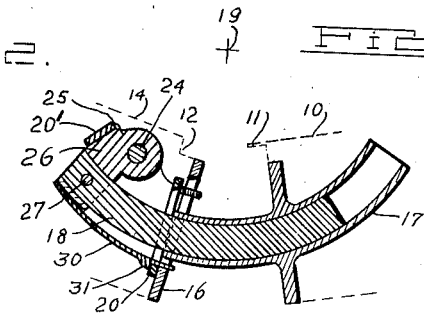
Fig. 3 is a horizontal section taken substantially centrally of the hinge construction shown in Fig. 1.
Figure 4:
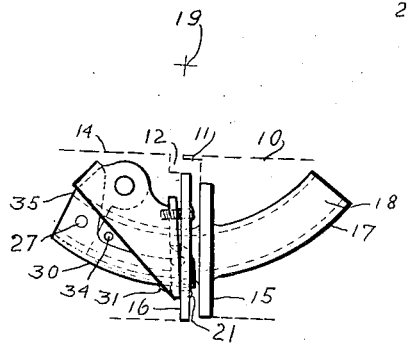
Fig. 4 is a view similar to Fig. 2, but shows the hinge construction in closed position; and, Fig. 5 is a section taken substantially on the line 5—5 of Fig. 2.

In Figs. 2, 3 and 4 of the drawing, the numeral 10 designates a closure element which ordinarily would be a door of an automotive vehicle body. The closure element 10 is provided with a peripheral overlap flange 11 adapted to cooperate with a channel 12 of a door frame, indicated generally by the numeral 14. A sealing strip of compressible material, such as sponge rubber or the like, is generally arranged in the channel 12 for cushioning and sealing the closure element relative to its frame.

Figure 1:
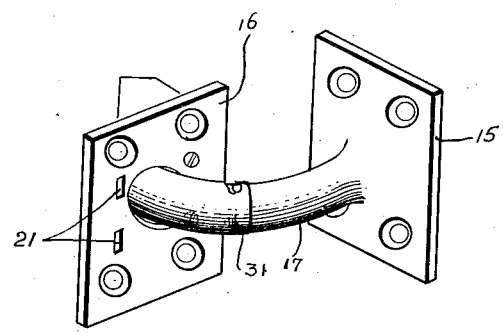
Figure 1 is a perspective view of a hinge constructed in accordance with the principles of the present invention.
Figure 5:
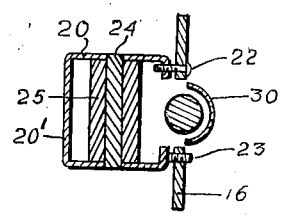

Referring also to Figs. 1 and 5, the improved hinge, as shown, comprises, broadly, two main plate members 15 and 16 adapted to be secured to the opposed edges of the closure element 10 and the door frame 14, respectively. The plate member 15 has an arcuate tubular or hollow element 17 formed integrally therewith which slidably receives an arcuate rod 18 carried by the other plate member 16.

The arcuate rod element 18 is adjustably secured to the plate member 16 by riveting one side of one face of the housing element 20 to the plate member 16 by rivets 21 as indicated in Figs. 1 and 2. The opposite side of said one face of the housing element 20 is connected to the plate member 16 by means of a screw or bolt 22 and a set screw 23. The screw 22 is merely journaled in the plate member 16 and threaded to the housing member 20 to draw the latter towards the plate member 16. The set screw 23 is threaded to the plate member 16 to move such opposite side of said one face of the housing member away from the plate member 16. By tightening both screws 22 and 23, the housing element 20 may be locked in the desired adjusted position relative to the plate member 16.

The housing element 20 has fixed thereto and projecting therethrough a pivot pin 24 on which is journaled by means of a bearing 25 a support arm 26 in which one end of the arcuate rod 18 is rigidly secured. The arcuate rod element 18 is pinned to its support arm 26 by means of a pin 27 which extends in both directions beyond the margins of the arm 26 to serve as a journal on which is swingably mounted a latch element 30. The latch element 30 throughout the major portion of its length is of generally semi-cylindrical section of a radius slightly greater than that of the tubular element 17, and is also of generally arcuate formation so as to enclose the latter in the manner indicated by Figs. 2 and 4.

The latch element 30 has an outwardly extending dog 31 adapted to engage the housing element 20 adjacent the rivets 21 to prevent rotation of the extension or arm 26 until such time as the latch 30 is released by disengaging the dog 31 with respect to the housing element 20. The dog 31 is adapted to be disengaged from the housing element 20 by virtue of the provision of a cam portion 33 adjacent the free end of the latch 30 and cooperable with a pin 34 secured to the adjacent end of the tubular element 17. When the tubular element 17 is slid outwardly with reference to the rod element 18, the camming portion 33 engages the pin 34 and draws the latch 30 towards the tubular element 17 releasing the dog 31 from engagement with the housing element 20.

The latch 30, adjacent the pin 27, on which it is journaled, is provided with a radially inwardly extending arm 35 which is engageable with the back wall 20' of the housing element 20 to swing the latch into position such that the dog 31 will engage the portion of the housing element 20 adjacent the rivets 21. This latching of the dog 31 to the housing element 20 occurs when the support arm or extension 26 for the rod element 18 is swung to its extreme clockwise position as viewed in Fig. 3.

Adjacent but inwardly of the camming portion 33, the latch 30 is provided with a shoulder 36 engageable with the pin 34 to maintain the tubular element 17 in extended relation with respect to the rod element 18 until the arm 35 engages the back wall 20' of housing element 20 which swings the latch 30 outwardly with reference to the tubular element 17, and permits the pin 34 to pass the shoulder 36. As previously indicated, engagement of the arm 35 of latch 30 with the back wall 20' of housing 20 swings the latch outwardly and positions the dog 31 so that it will engage the portion of the housing element 20 adjacent the rivets 21. The latch element 30 is made of thin material so that it may be flexed sufficiently to maintain the dog 31 in position to engage the housing element 20. It is also noted that the latch element 31 may be flexed by means of a screw driver or similar instrument to permit the pin 34 to pass the shoulder 36 and the camming portion 33 in order to disassemble the tubular element 17 with reference to the rod element 18 for the purpose of removing the door from its frame.

In the operation of the hinge with the parts in the position shown in Fig. 4, the tubular element 17 slides on the rod element 18 until the pin 34 engages the camming portion 33 to effect release of the dog 31 from engagement of that portion of the housing element 20 which lies adjacent the rivets 21. After the dog 31 has been released, further extension of the tubular element 17 sliding on the rod 18 is prevented by engagement of the pin 34 with the base of the cam-engaging portion 33, but since the dog 31 is released at this time, the closure element 10 may swing about the axis of the pivot 24 as a center until the rod element 18 engages the housing element 20 or the plate member 16. This brings the hinge parts to the position indicated in Fig. 2. It is noted that during the sliding movement of the tubular element 17 on rod 18 that the closure element 10 swings about an axis which passes vertically through the point indicated at 19 in Figs. 2 and 3. This is an imaginary vertical axis which intersects no mechanical parts of the hinge construction.

It is noted that with the parts in the position shown in Fig. 2 there is ample clearance between the closure element 10 or the peripheral overlap flange 11 thereof and the door frame elements, indicated generally at 14. This prevents any interference between these parts during opening and closing movements of the hinge even though the frame and door elements are of curved formation. On swinging the closure element 10 from the position of the parts indicated in Fig. 2, the sleeve or tubular element 17 first slides on the rod element 18 until the pin 34 engages shoulder 36, which stops further sliding movement of the element 17 on the element 18 until the arm 35 of latch 30 engages the back wall 20' of housing element 20 to release the pin 34 from the shoulder 36, the closure element 10 swinging about the axis of the pivot 24 as a center while the pin 34 is engaged with the shoulder 36. Upon release of the pin 34 from engagement with the shoulder 36, the tubular element 17 again slides on the rod 18 until the parts reach the position indicated in Fig. 4. The engagement of the arm 35 of latch 30 with the back wall 20' of housing element 20 places the dog 31 in position to engage the back of the housing element 20 so that when the closure element 10 is again opened the tubular element 17 will first slide on the rod element 18 as above described.

It is noted that the clearance between the plate members 15 and 16 can be adjusted by means of the screw 22 and set screw 23 which swing the upper margin of the housing element 20 as illustrated in Fig. 4, and moves the pivot 24 in the desired adjusted position relative to the plate member 16. This provides the desired clearance between the door and door frame and makes such adjustment comparatively simple since only a screw driver is required to turn the screw 22 and set screw 23. When both the screw 22 and set screw 23 are tightened with the housing 20 and pivot 24 in the desired adjusted position, the closure element 10 will be locked in the desired adjusted position relative to its frame with the proper clearance between these parts.

As many changes could be made in the above construction, and many apparently widely different embodiments of this invention could be had without departing from the scope thereof, it is intended that all matter contained in the above description or shown in the accompanying drawing shall be interpreted as illustrative and not in a limiting sense.

What is claimed is:

1. In a hinge adapted swingingly to connect a door to a door frame, the combination with two members adapted to be secured to the opposite edges of the door and door frame; of a partially annular and hollow element carried by one member, a partially annular rod carried by the other member and slidably journaled in said hollow element, pivot means for connecting said rod to the rod carrying member therefor for swinging movement of the rod about an axis disposed outside the confines of the rod, and means for adjusting the position of said pivot means relative to said rod carrying member to adjust the spacing of said door relative to said door frame.

2. In a hinge adapted swingingly to connect a door to a door frame, the combination with two members adapted to be secured to the opposed edges of the door and door frame; of a partially annular and tubular element carried by one member, a partially annular rod slidable in said tubular element, a housing element secured at one point to the other member, pivot means carried by said housing element for pivotally connecting said rod to said other element, and means at another point of said housing spaced from said first named point for adjusting the housing relative to said other member to adjust the spacing of said door relative to the door frame.

3. In a hinge adapted swingingly to connect a door to a door frame, the combination with two members adapted to be secured to the opposed edges of the door and door frame; of a partially annular and tubular element carried by one member, a partially annular rod slidable in said tubular element, a housing element riveted at one side of a face thereof to said other member, pivot means carried by said housing element for pivotally connecting said rod to said other member and threaded means at the opposite side of said face of the housing element for swingably adjusting the housing element relative to said other member to adjust the spacing of said door relative to the door frame.

4. In a hinge adapted swingingly to connect a door to a door frame, the combination with two members adapted to be secured to the opposed edges of the door and door frame; of a partially annular and hollow element carried by the member, a partially annular rod carried by the other member and slidably journaled in said hollow element, pivot means disposed outside the confines of the rod for connecting said rod to the carrying member therefor and means for controlling the extent of the sliding movement of said rod relative to said hollow element.

5. In a hinge adapted swingingly to connect a door to a door frame, the combination with two members adapted to be secured to the opposed edges of the door and door frame; of a partially annular and hollow element carried by one member, a partially annular rod carried by the other member and slidably journaled in said hollow element, pivot means disposed outside the confines of the rod for connecting said rod to the carrying member therefor, means for controlling the extent of the sliding movement of said rod relative to said hollow element, and means for adjusting said pivot means relative to the rod carrying member to adjust the spacing of said door relative to said door frame.

6. In a hinge adapted swingingly to connect a door to a door frame, the combination with two members adapted to be secured to the opposed edges of the door and door frame; of a partially annular and hollow element carried by one member, a partially annular rod carried by the other member and slidably journaled in said hollow element, pivot means for connecting said rod to the carrying member therefor, and latch means releasable at the end of the sliding movement of said rod relative to said hollow element while opening the door to allow the door to swing about the axis of said pivot means as a center.

7. In a hinge adapted swingingly to connect a door to a door frame, the combination with two members adapted to be secured to the opposed edges of the door and door frame; of a partially annular and hollow element carried by one member, a partially annular rod carried by the other member, and slidably journaled in said hollow element, pivot means for connecting said rod to the carrying member therefor and resilient latch means releasable approximately at the end of the sliding movement of said rod outwardly relative to said hollow element and after completion of the swinging movement of the door about the axis of said pivot means to permit the rod to be removed from said hollow element.

8. In a hinge adapted swingingly to connect a door to a door frame, the combination with two members adapted to be secured to the opposed edges of the door and door frame; of a partially annular hollow element carried by one member, a partially annular rod carried by the other member and slidably journaled in said hollow element, pivot means for connecting said rod to the carrying member therefor, latch means carried by said rod and comprising a dog means for preventing swinging movement of the door about the axis of said pivot means as a center until sliding movement of the rod relative to said hollow element is substantially complete while opening the door, and cam means for releasing said dog means to permit at this time swinging movement of the door about the axis of said pivot means as a center.

9. In a hinge adapted swingingly to connect a door to a door frame, the combination with two members adapted to be secured to the opposed edges of the door and door frame; of a partially annular and hollow element carried by one member, a partially annular rod carried by the other member and slidably journaled in said hollow element, pivot means for connecting said rod to the carrying member therefor, latch means carried by said rod and comprising a dog means for preventing swinging movement of the door about the axis of said pivot means as a center until sliding movement of the rod relative to said hollow element is substantially complete while opening the door, a pin carried by said hollow element, and cam means engageable with said pin for releasing said dog means to permit swinging movement of the door about the axis of said pivot means as a center.

10. A hinge adapted swingingly to connect a door to a door frame, the combination with two members adapted to be secured to the opposed edges of the doors and door frame; of a partially annular and hollow element carried by one member, a partially annular rod carried by the other member and slidably journaled in said hollow element, pivot means for connecting said rod to the carrying member therefor, latch means carried by said rod and comprising a dog means for preventing swinging movement of the door about the axis of said pivot means as a center until sliding movement of the rod relative to said hollow element is substantially complete while opening the door, a pin carried by said hollow element, cam means engageable with said pin for releasing said dog means, and a shoulder on said latch means engageable with said pin to limit movement of said door in a closing direction from a fully open position to swinging movement about the axis of said pivot means until the dog means again becomes effective to prevent swinging movement of the door about the axis of said pivot means as a center.

11. In a hinge adapted swingingly to connect a door to a door frame, the combination with two members adapted to be secured to the opposed edges of the door and door frame; of a partially annular and hollow element carried by one member, a partially annular rod carried by the other member and slidably journaled in said hollow element, pivot means connecting said rod to the carrying member therefor, latch means carried by said rod and comprising a dog means for preventing swinging movement of the door about the axis of said pivot means as a center until sliding movement of the rod relative to said hollow element is substantially complete while opening the door, a pin carried by said hollow element, cam means engageable with said pin for releasing said dog means to permit swinging movement of the door about the axis of said pivot means as a center, a shoulder on said latch engageable with said pin to limit movement in a closing direction from fully open position to swinging movement about the axis of said pivot means until the dog means again becomes effective to prevent swinging movement about the axis of said pivot means as a center, and an arm carried by said latch and engageable with a part fixed with respect to said rod carrying member for causing disengagement of said shoulder from said pin to permit sliding of said rod relative to said hollow element.

12. In a hinge adapted swingingly to connect a door to a door frame, the combination with two members adapted to be secured to the opposite edges of the door and door frame; of an arcuate tubular element carried by one member and an interfitting arcuate rod element carried by the other member and slidably journaled in said tubular element for causing said door to swing about an axis as a center and means for connecting said rod element to the carrying member therefor for causing the door to swing about a second axis as a center, both of said axes being disposed substantial distances outside the confines of said arcuate rod element.

13. In a hinge adapted swingingly to connect a door to a door frame, the combination with two members adapted to be secured to the opposite edges of the door and door frame; of an arcuate tubular element carried by one member and an interfitting arcuate rod element carried by the other member and slidably journaled in said tubular element for causing said door to swing about an imaginary axis as a center, and pivot means connecting said rod element to the carrying member therefor at a point disposed a substantial distance outside the confines of said arcuate rod element for causing said door to swing about the axis of said pivot means as a center.

WILLIAM BOBEK.